United States Patent
Araki

[11] Patent Number: 5,473,253
[45] Date of Patent: Dec. 5, 1995

[54] SEMICONDUCTOR SENSOR APPARATUS

[75] Inventor: Toru Araki, Itami, Japan

[73] Assignee: Mitsubishi Denki Kabushiki Kaisha, Tokyo, Japan

[21] Appl. No.: 178,740

[22] Filed: Jan. 7, 1994

[30] Foreign Application Priority Data

Jan. 11, 1993 [JP] Japan .................................. 5-002790

[51] Int. Cl.$^6$ .................................................. G01R 27/26
[52] U.S. Cl. ........................... 324/537; 340/652; 324/555
[58] Field of Search ................................. 324/537, 555, 324/556; 340/652, 653

[56] References Cited

U.S. PATENT DOCUMENTS

| | | |
|---|---|---|
| 3,883,753 | 5/1975 | Harrison, Jr. et al. ................ 340/652 |
| 4,031,461 | 6/1977 | Reiner .................................... 340/652 |
| 4,172,252 | 10/1979 | Wiberg ................................... 340/652 |
| 4,612,453 | 9/1986 | Yamazaki .............................. 340/652 |
| 4,841,286 | 6/1989 | Kummer ................................. 324/537 |

*Primary Examiner*—Maura K. Regan
*Attorney, Agent, or Firm*—Leydig, Voit & Mayer

[57] ABSTRACT

A semiconductor sensor apparatus includes a resistor connected between an output terminal and a power source terminal or a ground terminal of the semiconductor sensor apparatus while an output voltage corresponding to a physical parameter measured by the apparatus is generated. An output voltage limiting circuit in the semiconductor apparatus, during normal operation, limits the output voltage to values between an upper limit and a lower limit. When at least one of the power source terminal, the output terminal, and a ground terminal is open, the limiting circuit causes the output voltage to fall outside of the predetermined range. Thus, the disconnection of any of the power source terminal, the output terminal, and the ground terminal can be detected from the output voltage.

6 Claims, 4 Drawing Sheets

SEMICONDUCTOR SENSOR APPARATUS

BACKGROUND OF THE INVENTION

This invention relates to a semiconductor sensor and, more particularly, to a semiconductor sensor having a fault detection circuit.

FIGS. 6 and 7 illustrate equivalent circuits of a conventional semiconductor sensor to which the present invention pertains. In FIGS. 6 and 7, the semiconductor sensor comprises a semiconductor sensor circuit 3 in which a semiconductor sensor element 1 which detects and measures a physical parameter such as pressure, velocity, acceleration or the like, and a semiconductor differential amplifier circuit 2 which processes an output signal from the semiconductor sensor element 1 are integrated. The semiconductor sensor circuit 3 is contained within a single case as shown by dot-and-dash line as a semiconductor sensor apparatus 4, which is connected to a power source 5, an output 6 and ground 7. The semiconductor sensor circuit 3 comprises a power source terminal 5a, an output terminal 6a and a ground terminal 7a, and the semiconductor sensor apparatus 4 comprises a power source terminal 5b, an output terminal 6b and a ground terminal 7b. The output terminal 6b is connected to an analogue-digital converter (A-D converter) 9 of a control unit 8 to which the signal from the semiconductor sensor apparatus 4 is supplied, the input impedance of the A-D converter 9 being designated by reference numeral 10.

FIG. 7 illustrates an equivalent circuit of an output portion of the semiconductor sensor circuit 3 illustrated in FIG. 6. As apparent from this equivalent circuit, the semiconductor sensor circuit 3 comprises an emitter-grounded NPN transistor 11 which is the output of the semiconductor sensor circuit 3, a parasitic diode 12 of which cathode is connected to the collector of the NPN transistor 11 and the anode is connected to the ground, a first PNP transistor 13 which is the load of the NPN transistor 11 and a second PNP transistor 14 constituting a current mirror circuit together with the first PNP transistor 13. The second PNP transistor 14 is connected as its base to the base of the first PNP transistor 13 and at its emitter to the emitter of the first PNP transistor 13 and its collector is connected to its own base. A constant current source 15 is connected to the base and the collector of the second PNP transistor to determine the constant current flowing through the first PNP transistor 13, and the base of the NPN transistor 11 is connected to an amplifier circuit 16. The internal impedance of the semiconductor sensor circuit 3 between the power source 5 and the ground 7 is designated by reference numeral 17.

The operation of the conventional semiconductor sensor having the above-described structure will now be described. In FIG. 6, the output from the semiconductor sensor element 1 of an acceleration sensor, for example, is amplified by the differential amplifier circuit 2 and input into the A-D converter 9 of the control unit 8 through the output terminals 6a and 6b. The A-D converter 9 converts the analogue signal into the digital signal and is used in the control by the control unit 8.

The maximum value of the output voltage $V_{O(max)}$ of the semiconductor sensor circuit is expressed by $$V_{O(max)} = V_{cc} - V_{sat13} \quad (1)$$

where $V_{cc}$ is voltage at the power source terminal 5a, and $V_{sat13}$ is the saturation voltage of the first PNP transistor 13.

Also, the minimum value of the output voltage of the semiconductor sensor circuit 3 is expressed by $$V_{O(min)} = V_{sat11} \quad (2)$$

where $V_{sat11}$ is the saturation voltage of the NPN transistor 11.

Thus, the output voltage from the semiconductor sensor apparatus 4 falls within the range of from $V_{sat11}$ to $V_{cc} - V_{sat13}$.

A description will now be given in terms of the output voltage produced when a breakage takes place between the power source terminals 5a and 5b. In this case, since the semiconductor sensor circuit 3 is provided with no electrical power, the NPN transistor 1 and the first PNP transistor 13 are interrupted. Therefore, since the output terminal 6b rises to a very high impedance, the voltage is substantially equal to the ground potential due to the input impedance 10 of the A-D converter 9.

When a breakage takes places between the ground terminals 7a and 7b, while the NPN transistor 11 and the PNP transistor 13 are similarly interrupted, the electrical current flows from the power source terminal 5a to the input impedance 10 of the A-D converter 9 through the semiconductor sensor element 1 and the internal impedance 17 and the parasitic diode 12. The output voltage $V_{O(7open)}$ from the semiconductor sensor apparatus 4 at this time is:

$$V_{o(7open)} = (V_{cc} - V_{F12}) \times [R_{I(A-D)}]/[R_{I(A-D)} + R_G //R_i] \quad (3)$$

where, $R_G$ is a gauge resistance of the semiconductor sensor element 1 (i.e., impedance between the power source 5 and the ground 7), $R_i$ is a resistance of the internal impedance, $R_{I(A-D)}$ is the input impedance 10 of the A-D converter 9, and $V_{F12}$ is a forward voltage of the parasitic diode 12. Therefore, when $V_{cc}$=5 V, $R_G$=3 kΩ, $R_i$=10 kΩ, $R_{I(A-D)}$=10 MΩ and $V_{F12}$=0.6 V, then $V_{O(7open)}$ equals to about 4.40 V.

As has been described, when the connection breakage takes place in the power source terminals 5a and 5b and the output terminals 6a and 6b, the outputs are at about the ground potential, and when the connection breakage takes place at the ground terminals 7a and 7b, the output voltage is about 4.4 V when $V_{cc}$=5 V. However, when the disconnection takes place either at the power source terminals 5a and 5b and the output terminals 6a and 6b, the grounding is achieved through the input impedance 10 of the A-D converter 9, resulting in a high impedance relative to the ground. The output voltage is subjected to noise on the wiring conductor extending from the output terminal 6b to the control unit 8, a very unstable potential which may often fall within the normal output voltage range during the normal semiconductor sensor operation. Therefore, it is often impossible to distinguish the output signals generated during the normal semiconductor sensor operation from the output signals generated when the electrical connection is broken and disconnected. Also, when the ground terminals 7a and 7b are disconnected, the potential at the output terminal 6b is at about 4.4 V, and if it is assumed that $V_{sat13}$=0.2 V as in the above equation (1), the maximum output voltage $V_{O(max)}$ is 4.8 V. Thus, the output voltage can be equal to the potential of the output voltage generated when the ground terminals 7a and 7b are disconnected even when the semiconductor sensor apparatus 4 is correctly operating, making it impossible to distinguish the output signals generated when the connection is broken from those generated during normal operation.

Thus, in either case, it is impossible to detect the breakage of the power source terminals 5a and 5b, the output terminals 6a and 6b, and the ground terminals 7a and 7b of the semiconductor sensor apparatus 4 on the basis of the output voltage from the output terminals 6b.

SUMMARY OF THE INVENTION

Accordingly, one object of the present invention is to provide a semiconductor sensor apparatus free from the above discussed problems of the conventional sensor apparatus.

Another object of the present invention is to provide a semiconductor sensor apparatus which accurately detects disconnection of the terminal portions.

With the above objects in view, the semiconductor sensor apparatus of the present invention comprises a resistor connected between an output terminal and a power source terminal or a ground terminal externally of the semiconductor sensor apparatus for generating an output voltage corresponding to a physical parameter to be measured. An output voltage limiting circuit is disposed internally of the semiconductor apparatus which, during normal operation, limits at least one of upper and lower limits of the output voltage from the sensor apparatus so that the output voltage is within a predetermined range. When at least one of the power source terminals, the output terminal and a ground terminal is broken, the limiting circuit converts the output voltage from the output terminal of the semiconductor sensor apparatus so that it becomes a value outside of the predetermined range. Thus, the breakage of one of the power source terminal, the output terminal and the ground terminal can be detected from the magnitude of the output voltage.

BRIEF DESCRIPTION OF THE DRAWINGS

The present invention will become more readily apparent from the following detailed description of the preferred embodiments thereof taken in conjunction with the accompanying drawings, in which.

DESCRIPTION OF THE PREFERRED EMBODIMENTS

Figure 1:
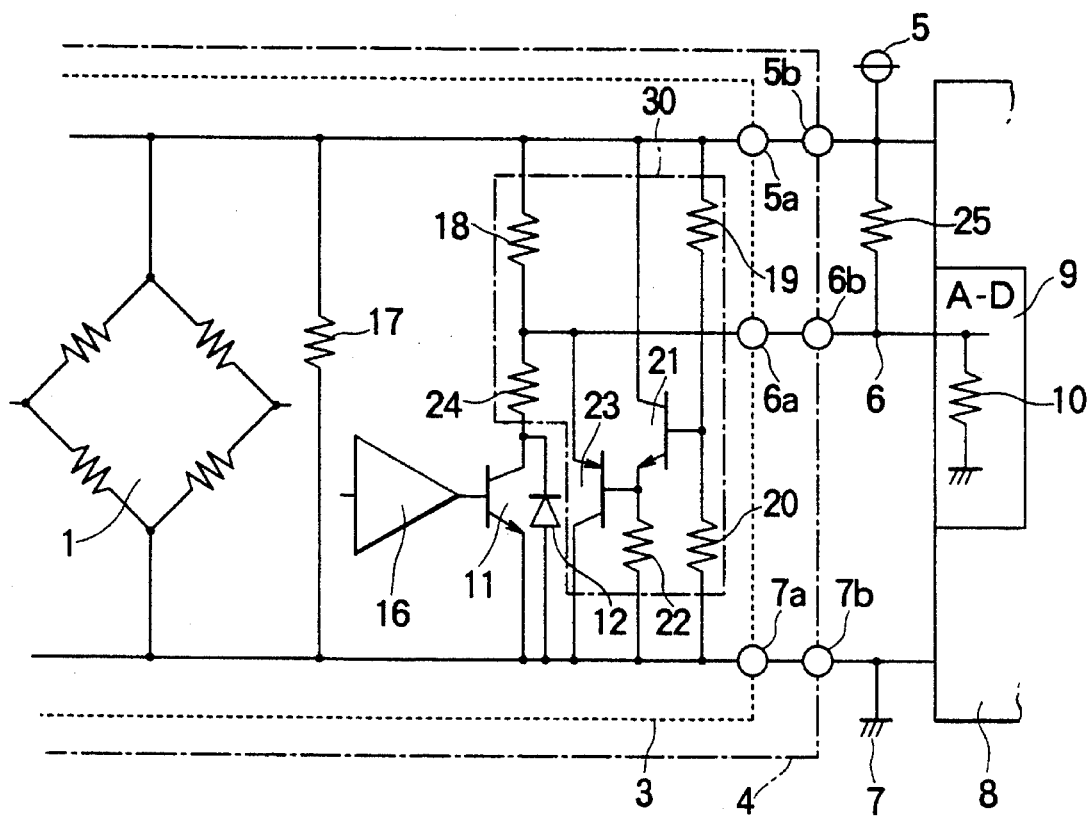
FIG. 1 is an equivalent circuit diagram illustrating one embodiment of a semiconductor sensor apparatus of the present invention.

In FIG. 1, the semiconductor sensor apparatus of the present invention comprises a resistor 25 connected between an output terminal 6b and a power source 5 externally of the semiconductor sensor apparatus 4 and an output voltage limiting circuit 30 disposed within the semiconductor sensor apparatus 4 for limiting the output voltage from the semi-conductor sensor apparatus 4, the arrangement being such that the wire breakage can be detected by monitoring the output voltage from the output terminal 6b. The output voltage limiting circuit 30 comprises a resistor 18 connected between the power source terminal 5a and the output terminal 6a internally of the semiconductor sensor circuit 3, a resistor 19 connected at one end to the power source 5, a resistor 20 having one end connected to the other end of the resistor 19 and the other end connected to the ground terminal 7a, an NPN transistor 21 connected at its collector to the power source terminal 5a, a resistor 22 having one end connected to the emitter of the NPN transistor 21 and the other end connected to he ground terminal 7b, a PNP transistor 23 having its collector connected to the ground terminal 7b and its emitter connected to the output terminal 6a and a resistor 24 connected between the collector of the NPN transistor 11 and a junction between the resistor 18 and the output terminal 6a. The resistor 18, 19, 20, 22, 24 and the NPN transistor 21, and the PNP transistor 23 are disposed internally of the semiconductor sensor circuit 3 and constitute the output voltage limiting circuit 30.

Figure 2:
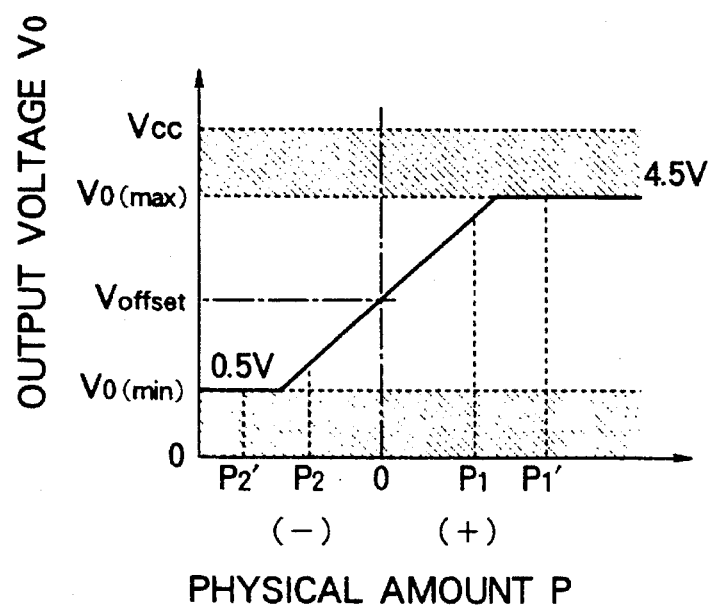
FIG. 2 is a graph showing characteristics of a semiconductor sensor apparatus according to the present invention.

The operation of the semiconductor sensor above will now be described. First, it is now assumed that a physical parameter P to be detected by the semiconductor sensor element 1 is a vector amount such as acceleration, so the value can be either positive or negative, and the output voltage $V_0$ from the semiconductor sensor circuit 3 has an offset voltage $V_{offset}$ when the physical parameter P is 0. Also, this offset voltage $V_{offset}$ is a value (such as ½ $V_{cc}$) within a range of the potential difference $V_{cc}$ across the power source 5 and the ground 7 (FIG. 2). When it is assumed that the output voltage $V_0$ increases when the physical parameter P increases, then the output voltage $V_0$ becomes greater than $V_{offset}$ when the physical parameter P is positive and the output voltage $V_0$ is smaller than $V_{offset}$ when the physical parameter P is negative.

A description will now be given as to the detection of the wire breakage of the power source terminals 5a and 5b, the output terminals 6a and 6b and the ground terminals 7a and 7b. The output voltage $V_{0(5open)}$ at the output 6 when the power source terminals 5a and 5b are broken is $$V_{0(5open)}V_{cc}[(R_{18}+R_G//R_i)//R_{I(A-D)}]/[R_{25}+(R_{18}+R_G//R_i)//R_{I(A-D)}] \quad (4)$$

where, $R_{18}$ is the resistance of the resistor 18 and $R_{25}$ is the resistance of the resistor 25. If $R_{25}$=220 kΩ, $R_{18}$=5 kΩ, $R_i$=10 kΩ, $R_{I(A-D)}$=10 MΩ and $V_{cc}$=5 V, $V_{0(5open)}$=0.16 V.

Next the output voltage $V_{0(6open)}$ at the output 6 when the output terminals 6a and 6b are broken is $$V_{0(6open)}=V_{cc}(R_{I(A-D)})/(R_{25}+R_{I(A-D)}) \quad (5)$$

The $V_{0(6open)}$ similarly calculated is nearly equal to 4.99 V.

Lastly, the output voltage $V_{0(7open)}$ at the output 6 when the ground terminals 7a and 7b are broken is $$V_{0(7open)}=V_{cc}(R_{I(A-D)})/(R_{18}//R_{25}+R_{I(A-D)}) \quad (5)$$

Similarly calculated, $V_{0(7open)}$ is also nearly equal to 5.0 V.

Therefore, by arranging that an output smaller than 0.5 V or greater than 4.5 V would never be provided as the output $V_0$, it is possible to determine that a wire breakage occurs in the terminal when a voltage smaller than 0.5 V or greater than 4.5 V is provided.

A description will now be given as to the output voltage limiting circuit 30 which ensures that an output smaller than 0.5 V or greater than 4.5 V is not supplied as the output $V_O$. The minimum value $V_{O(min)}$ of the output voltage from the semiconductor sensor circuit 3 of FIG. 1 is $$V_{O(min)}=V_{sat11}+(V_{cc}-V_{sat11})(R_{24})/(R_{24}+R_{18}//R_{25}) \quad (7)$$

where, $R_{24}$ is the resistance of the resistor 24. Therefore, the output voltage is not smaller than 0.5 V when $V_{sat11}=0.2$ V, $R_{18}=5$ kΩ, $R_{24}0.33$ kΩ, $R_{25}=220$ kΩ, and $V_{cc}=5$ V.

The maximum value $V_{O(max)}$ of the output from the semiconductor circuit 3 is obtained as follows:

A voltage divided by the resistor 19 and the resistor 20 is applied to the base of the NPN transistor 21 and the emitter voltage $V_{E(21)}$ at this time is $$V_{E(21)}=[(R_{20})/(R_{19}+R_{20})]V_{CC}-V_{BE(21)} \quad (8)$$

where, $R_{19}$ is the resistance of the resistor 19, $R_{20}$ is the resistance of the resistor 20 and $V_{BE(21)}$ is the on voltage across the base and the emitter of the NPN transistor 21. The resistor 22 is the load of the emitter-follower operating NPN transistor 21, and $V_{E(21)}$ is the base potential of the PNP transistor 23, so that, by rewriting the equation (8), $$V_{B(23)}=[(R_{20})/(R_{19}+R_{20})]V_{cc}-V_{BE(21)} \quad (9)$$

where, $V_{BE(23)}$ is the base potential of the PNP transistor 23.

Since the base potential of the PNP transistor 23 is a constant voltage as shown by the equation (9), the PNP transistor 23 does or does not allow a collector current to flow depending upon the emitter potential. That is, in order to activate the PNP transistor 23, the emitter potential is $$V_{E(23)} \geq V_{B(23)}+V_{BE(23)} \quad (10)$$

where, $V_{E(23)}$ is the emitter potential of the PNP transistor 23 and $V_{BE(23)}$ is the on voltage across the base and the emitter of the PNP transistor 23. From the equations (9) and (10), $$V_{E(23)} \geq [(R_{20})/(R_{19}+R_{20})]V_{cc}-V_{BE(21)}\pm V_{BE(23)} \quad (11)$$

When it is assumed that $V_{BE(23)}$ is substantially constant irrespective of the emitter current of the PNP transistor 23 (actually, it is proportional to the natural logarithm of the emitter current), $$V_{E(23)}=[(R_{20})/(R_{19}+R_{20})]V_{CC} \quad (12)$$

where, $V_{BE(12)}=V_{BE(23)}$, that is, the maximum output voltage $V_{O(max)}$ from the semiconductor sensor circuit 3 is $$V_{O(max)}=[(R_{20})/(R_{19}+R_{20})]V_{cc} \quad (13)$$

Here, when $R_{19}=5$ kΩ and $R_{20}=45$ kΩ, $V_{O(max)}=4.5$ V.

As has been described, owing to the resistors 18, 24, 25, 19 and 20, the NPN transistors 11 and 21 as well as the PNP transistor 23, the output $V_O$ of the semiconductor sensor circuit 3 cannot be a value smaller than 0.5 V or greater than 4.5 V, so that the characteristics of the semiconductor sensor circuit 3 are as shown in FIG. 2. In this figure, as for the physical parameter P, the normal measurement range is from $P_1$ to $P_2$, and the output $V_O$ is fixed at $V_{O(max)}$ when the physical parameter P is $P_1'$ and the output $V_O$ is fixed at $V_{O(min)}$ when the physical parameter P is $P_2'$. When $V_O$ falls within the range of from $V_{O(max)}$ to $V_{cc}$ and within the range of from $V_{O(min)}$ to 0, one of the terminals of the semiconductor sensor apparatus 4 is broken.

Thus, the wire breakage of the semiconductor sensor apparatus 4 can be detected, and by arranging a program for controlling the operating modes so that the control circuit 8 does not take the output voltage $V_0$ of the semiconductor sensor apparatus 4 into consideration when the output voltage $V_0$ is within the range indicating the wire disconnection (the shaded range in FIG. 2), a reliable control unit can be realized. If necessary, an alarm such as lighting of an indication lamp can be generated when the output voltage $V_O$ falls within the shaded range representing the wire disconnection.

Figure 3:
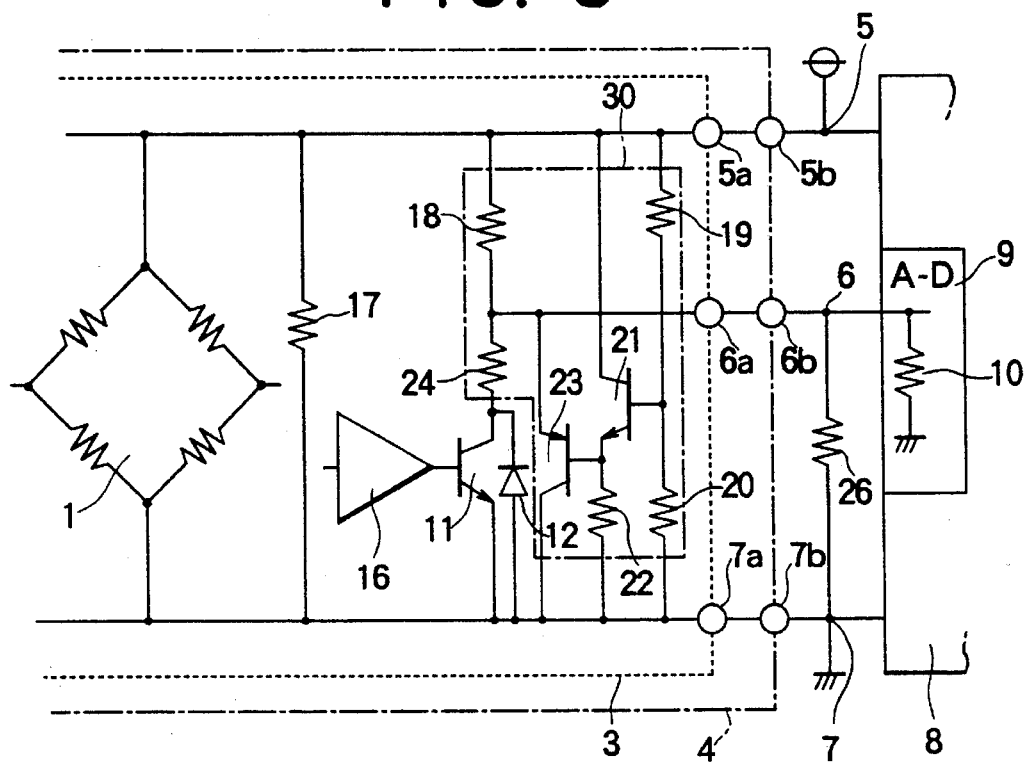
FIG. 3 is an equivalent circuit diagram illustrating another embodiment of the semiconductor sensor apparatus according to the present invention.

FIG. 3 illustrates another embodiment in which a resistor 26 is inserted between the output 6 and the ground 7 and there is no resistor inserted between the power source 5 and the output 6, differing from the first embodiment. In this case also, the resistor 26 must be disposed externally of the semiconductor sensor apparatus 4. The contents of the output voltage limiting circuit 30 are identical to those illustrated in FIG. 1. When the power source terminal 5a or 5b is disconnected, the transistors within the semiconductor sensor circuit 3 are all in the off state and the output terminal 6b is terminated at the parallel resistance of the resistor 26 and the input impedance 10. By making the resistor 26 significantly smaller than the input impedance 10, the output voltage $V_O$ is 0 V because the output 6 is grounded through the resistors 26. Similarly, when he output terminal 6a or 6b is disconnected, the output 6 is grounded through the resistor 26 so that the output voltage $V_O$ is 0 V. When the ground terminal 7a or 7b is disconnected, the output voltage $V_{O(7open)}$ is $$V_{O(7open)}=[(R_{26}//R_{I(A-D)})/(R_{26}//R_{I(A-D)}+R_{18})]V_{cc} \quad (14)$$

where, $R_{26}$ is the resistance of the resistor 26. When $R_{26}=220$ kΩ, $R_{I(A-D)}=10$ MΩ, $R_{18}=5$ kΩ and $V_{cc}=5$ V, $V_{O(7open)}=4.89$ V.

Therefore, similar to the previous embodiment, by arranging the output $V_0$ of the semiconductor sensor circuit 3 so that it does not become smaller than 0.5 V or greater than 4.5 V, the wire disconnection of the terminals of the semiconductor sensor apparatus 4 can be detected by monitoring the output voltage $V_0$.

Figure 4:
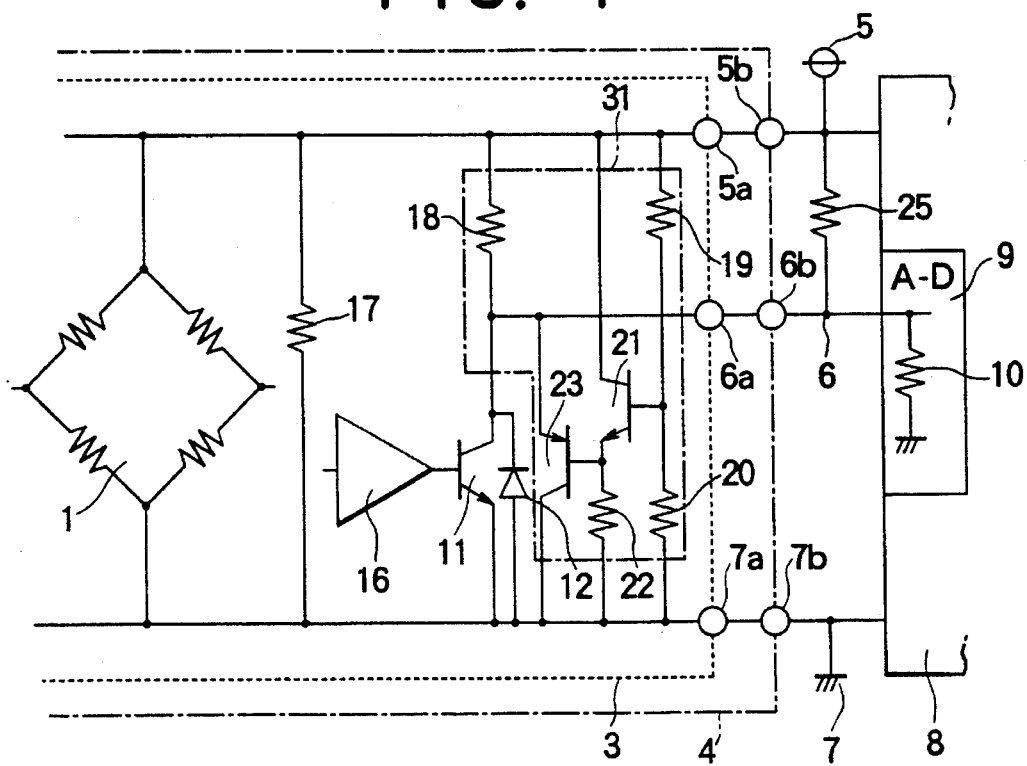
FIG. 4 is an equivalent circuit diagram illustrating another embodiment of a semiconductor sensor apparatus according to the present invention.
Figure 5:
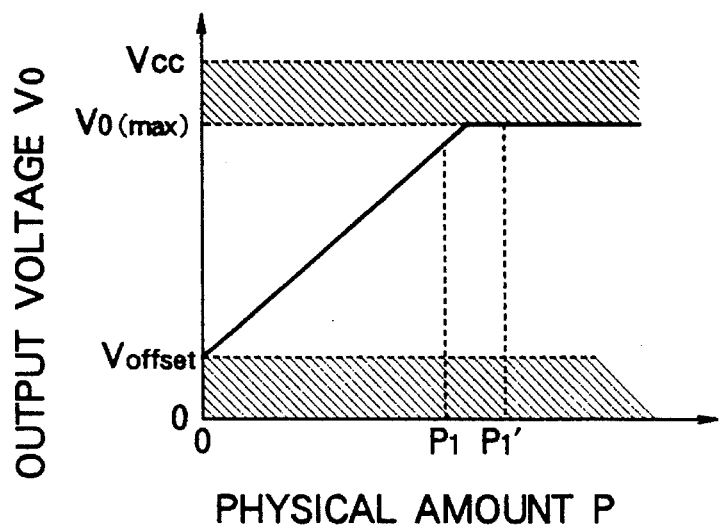
FIG. 5 is a graph showing characteristics of a semiconductor sensor apparatus according to embodiment of the present invention.
Figure 6:
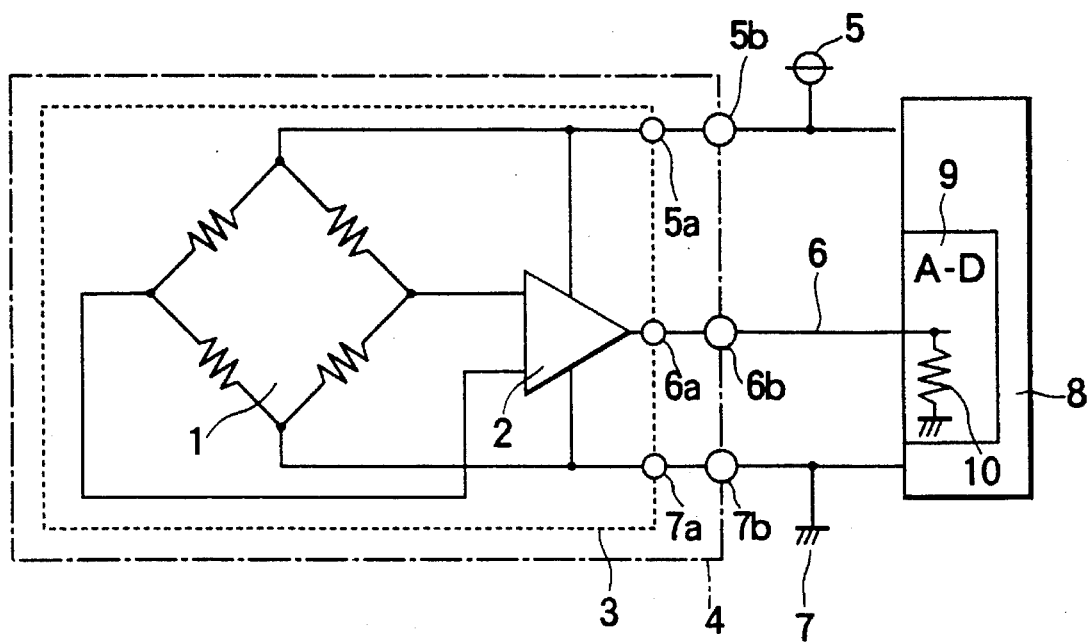
FIG. 6 is a block diagram illustrating a conventional semiconductor sensor apparatus.
Figure 7:
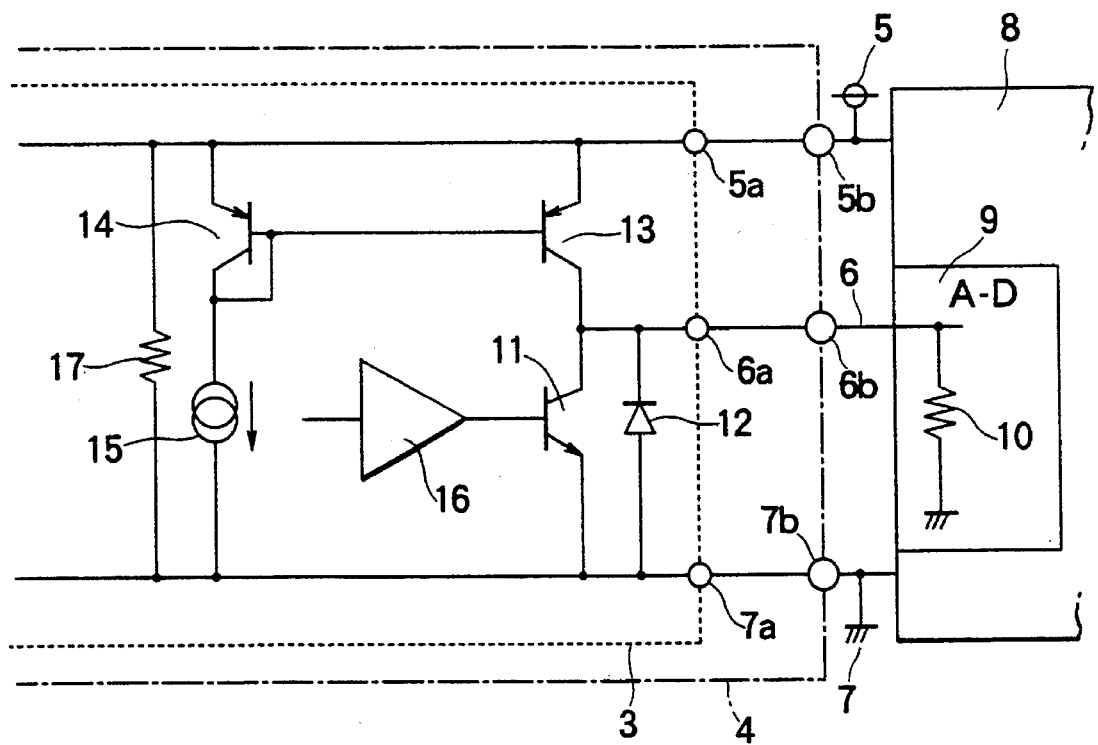
FIG. 7 is an equivalent circuit diagram illustrating the conventional semiconductor sensor apparatus.

When a physical parameter P, such as an absolute pressure, which does not become negative as illustrated in FIG. 5, is to be measured by the semiconductor sensor element 1, the resistor 24 of the output voltage limiting circuit 30 illustrated in FIGS. 1 and 3 is not necessary because it is sufficient to limit the output voltage $V_0$ at the maximum voltage $V_{O(max)}$ when $V_{O(min)}$ is made $V_{offset}$, so that an output voltage limiting circuit 31 in which no resistor corresponding to the resistor 24 is provided as illustrated in FIG. 4. In this case, the usual measurement range of the physical parameter P is from 0 to $P_1$. When $V_0$ is greater than $V_{offset}$ or $V_{O(max)}$, it can be determined that one of the terminals of the semiconductor sensor 4 is disconnected.

Also, while the semiconductor sensor element 1 driven by the constant voltage drive system in which the semiconductor sensor element 1 is inserted between the power source 5 and the ground 7 in the previous embodiments, similar advantageous results can be obtained by the constant current drive system in which the semiconductor sensor element 1 is driven by a constant current source. This arrangement is preferable in terms of the temperature characteristics. In this case, however, the impedance between the power source 5 and the ground 7 of the semiconductor sensor circuit 3 is the resistor 17 along ($R_{17}$). The semiconductor sensor element 1 may be of any suitable known type.

As has been described, according to the semiconductor sensor apparatus of the present invention, a resistor is provided between the semiconductor sensor apparatus and the power source of the ground, and an output voltage limiting circuit for limiting the output voltage is disposed within the semiconductor sensor apparatus so that a wire disconnection can be detected on the basis of the voltage value at the output terminal when any of the terminals of the semiconductor sensor apparatus is broken, whereby the semiconductor sensor apparatus can be made inexpensive and highly reliable.

What is claimed is:

1. A sensor apparatus indicating disconnections within a sensor circuit in he sensor apparatus, the sensor apparatus comprising:

a sensor circuit having a power source terminal, a ground terminal, an output terminal and including:

a sensor element for sensing a physical parameter and outputting a sensed signal indicative of the physical parameter, the sensor element being connected to the power source and ground terminals; and a voltage limiting circuit connected to the power source and ground terminals and receiving the sensed signal from the sensor element for providing an output voltage at the output terminal in response to the sensed signal and limiting the output voltage to a voltage range having an upper limit and a lower limit; and an impedance element connected to the output terminal and one of the power source and ground terminals whereby the voltage at the output terminal is outside of the range when either of the power source terminal and the ground terminal is disconnected from either of the sensor element and the voltage limiting circuit or when the output terminal is disconnected form the voltage limiting circuit.

2. The sensor apparatus of claim 1 wherein the impedance element is a resistor connected to the output terminal and the ground terminal.

3. The sensor apparatus of claim 1 wherein the impedance element is a resistor connected to the output terminal and the power source terminal.

4. The sensor apparatus of claim 1 including a control unit having an input impedance and an input connected to the output terminal for detecting the output voltage and generating an alarm when the output voltage is outside the range.

5. The sensor apparatus of claim 4 wherein the impedance element is a resistor having a resistance substantially less than the input impedance of the control unit.

6. The sensor apparatus of claim 4 wherein the control unit comprises an analog-to-digital converter.

* * * * *

UNITED STATES PATENT AND TRADEMARK OFFICE
CERTIFICATE OF CORRECTION

PATENT NO.   :   5,473,253
DATED        :   December 5, 1995
INVENTOR(S)  :   Araki It is certified that error appears in the above-indentified patent and that said Letters Patent is hereby corrected as shown below:

Column 7, Line 10, change "he" to --the--;

Column 8, Line 6, change "form" to --from--.

Signed and Sealed this

Thirtieth Day of July, 1996

Attest:

BRUCE LEHMAN

*Attesting Officer*    *Commissioner of Patents and Trademarks*